United States Patent [19]

Shinjiro et al.

[11] Patent Number: 4,768,921

[45] Date of Patent: * Sep. 6, 1988

[54] TURBOMOLECULAR VACUUM PUMP

[75] Inventors: Ueda Shinjiro, Abiko; Osami Matsushita, Tomobe; Naoyuki Tamura, Kudamatsu; Yoshiteru Miyatake, Hitachi, all of Japan

[73] Assignee: Hitachi, Ltd., Tokyo, Japan

[*] Notice: The portion of the term of this patent subsequent to Apr. 1, 2003 has been disclaimed.

[21] Appl. No.: 42,627

[22] Filed: Apr. 23, 1987

Related U.S. Application Data

[63] Continuation of Ser. No. 590,328, Mar. 16, 1984, abandoned.

[30] Foreign Application Priority Data

Mar. 16, 1983 [JP] Japan .................................. 58-42143

[51] Int. Cl.[4] .............................................. F01D 1/36
[52] U.S. Cl. .................................. 415/90; 415/170 R; 310/90.5; 384/446
[58] Field of Search ................... 415/90, 199.5, 170 R; 416/500; 310/90.5; 384/446

[56] References Cited

U.S. PATENT DOCUMENTS

| | | | |
|---|---|---|---|
| 3,856,200 | 12/1974 | Lieb | 310/90.5 |
| 4,111,595 | 9/1978 | Becker et al. | 415/90 |
| 4,196,946 | 4/1980 | Lipscomb | 310/90.5 |
| 4,541,772 | 9/1985 | Becker | 415/90 |
| 4,579,508 | 4/1986 | Tsumaki et al. | 415/90 |
| 4,609,332 | 9/1986 | Miki et al. | 310/90.5 |

FOREIGN PATENT DOCUMENTS

| | | | |
|---|---|---|---|
| 2825551 | 12/1979 | Fed. Rep. of Germany | 415/90 |
| 1475765 | 4/1967 | France | 415/90 |

*Primary Examiner*—Robert E. Garrett
*Assistant Examiner*—John T. Kwon
*Attorney, Agent, or Firm*—Antonelli, Terry & Wands

[57] ABSTRACT

A turbomolecular vacuum pump having stator blades disposed in a multistage fashion within a casing in an axial direction thereof, and rotor blades which are located between respectively adjacent stator blades and are mounted on an outer periphery of a rotor situated centrally of the casing. A motor rotor is fixed to a rotating member which is formed of the rotor having the rotor blades fixed to the outer periphery, and a motor stator opposite to the motor rotor is arranged so as to construct a drive mechanism for the rotating member. The rotating member is supported at a lower portion thereof by a pivot-type plane bearing, and a magnetic bearing is arranged in such a manner so as to oppose a lower end of the rotor and a supporting member for the rotating member.

13 Claims, 3 Drawing Sheets

TURBOMOLECULAR VACUUM PUMP

This application is a continuation of application Ser. No. 590,328, filed Mar. 16, 1984, now abandoned.

BACKGROUND OF THE INVENTION

The present invention relates to a vacuum pump and, more particularly, to a turbomolecular pump for establishing a clean ultra-high vacuum.

A vacuum chamber having a high degree of vacuum has been required in nuclear fusion reactors, semiconductor production plants, electron microscope devices, etc. And, for this purpose, a so-called turbomolecular vacuum pump, exhibiting an excellent evacuation performance in a molecular flow region, has generally be adopted therefor.

While the performance of conventional turbomolecular vacuum pumps has been up to approximately $10^{-10}$ Torr in terms of the degree of vacuum, it has been desired to achieve a still higher degree of ultra-high vacuum due to the enhanced performances of various apparatus to which the vacuum pump may be applied. Moreover, not only is it desirous to bring the degree of vacuum to a ultra-high vacuum, it is also necessary to attain a clean ultra-high vacuum in which a hydrocarbon residual gas such as, for example, oil vapor does not exist.

In principle, considering the mechanism and operation of a turbomolecular pump, a great compression ratio can be set for the oil vapor or the like having a large molecular weight in a gas stage, and such substance is emitted well so that a realization of a clean vacuum is basically possible.

However, in many conventional turbo molecular vacuum pumps, it is necessary to provide a ball bearing arrangement of a mechanical contact type for a rotor of the pump in order to enable a high speed rotation and, consequently, it is necessary that a bearing oil be supplied to the bearing for the purpose of lubrication thereof. Although a turbomolecular vacuum pump employing the ball bearing performs tentative evacuation to attain a clean vacuum during operation, the rotating ability is limited due to, for example, vibrations, etc. Additionally, once the turbomolecular vacuum pump has stopped operating, the oil vapor of the lubricating oil of the bearings may diffuse in the reverse direction to the high vacuum side thereby staining the vanes of the pump and the vacuum chamber.

In order to alleviate the above noted problems, a turbomolecular vacuum pump has been proposed in, for example, U.S. Pat. No. 4,023,920, wherein all bearings are fashioned as controlled magnetic bearings. However, a disadvantage of this proposed vacuum pump resides in the fact that complicated mechanisms such as control devices, etc., are required. Additionally, in this proposed vacuum pump the control is intricate and the maintenance and inspection thereof are relatively difficult. A further disadvantage resides in the fact that a turbomolecular vacuum pump with controlled magnetic bearings is very expensive to manufacture.

In, for example, U.S. Pat. No. 4,111,595, a vacuum pump arrangement is proposed wherein magnetic bearings arranged on a high vacuum side thereof are in the form of a permanent-magnet. While the provision of a permanent-magnet bearing dispenses with the need for complicated control mechanisms and, to some extent, reduces the overall manufacturing costs, a disadvantage of this proposed construction resides in the fact that a permanent magnet is usually made of a sintered metal which has a large quantity of emission gas when compared with stainless steel or the like. thus, the problem arises that the influence of the gas emitted from the permanent magnet arranged on the high vacuum side increases as the degree of vacuum rises to limit the arrival degree of the vacuum pump.

SUMMARY OF THE INVENTION

Accordingly, the aim underlying the present invention essentially resides in providing a turbomolecular vacuum pump which enhances the arrival degree of vacuum with vibration-dynamic stability and which pump is excellent in attaining a clean ultra-high vacuum when the operation of the vacuum pump is stopped.

In accordance with advantageous features of the present invention, a turbomolecular vacuum pump is provided which includes stationary vanes which are disposed, in a multistage fashion within a casing in an axial direction thereof, said rotor blades which are located between the respectively adjacent stationary vanes and which are disposed on an outer periphery of a rotor situated centrally of the casing. A drive mechanism is provided which includes a motor rotor, fixed to a rotating member which is formed of the rotor having the blades fixed to the outer periphery thereof, and a motor stator disposed opposite to the motor rotor. The rotating member is supported at a lower portion thereof by a pivot type plane bearing having a saucer. A magnetic bearing is arranged in such a manner so as to oppose a lower end of the rotor and a supporting member for the rotating member.

Advantageously, in accordance with further features of the present invention, a suction side of the turbomolecular vacuum pump is connected to a vacuum device of, for example, a nuclear fusion reactor or the like, and the rotor is rotated to evacuate the vacuum device into a high vacuum due to a turbine compression action between the stator blades and the rotor blades facing the interspaces of the stator blades.

Advantageously, in accordance with the present invention, the pivot type plane bearing which supports the rotor is received in the rotor and the magnetic bearing, representing the other bearing is arranged between the lower end of the rotor and the rotating member on the low vacuum side. Consequently, an emission gas from the bearing is suppressed to the utmost and the rotating member is rotated stably vibration-dynamically, whereby a clean ultra-high vacuum is established in the vacuum device.

In accordance with still further features of the present invention, the motor rotor is mounted on a rotary shaft of the rotating member, with a cylindrical member extending vertically from the supporting member of the rotating member being disposed concentrically with the rotary shaft. The motor stator is disposed inside of the cylindrical member in opposition to the motor rotor.

It is also possible in accordance with the present invention for the motor rotor to be disposed inside the rotor mounting the rotor blades, with a cylindrical member extending from the supporting member for the rotating member being disposed concentrically with the motor rotor, and with the motor stator being disposed outside of the cylindrical member in opposition to the motor rotor.

The pivot type plane bearing may, in accordance with the present invention, be constructed so as to extend upwardly along an inner side of the cylindrical member.

Advantageously, in accordance with yet further features of the present invention, the drive mechanism may be fashioned as an end plate motor and, for this purpose, a cylindrical member is vertically extended from the supporting member for the rotating member along an inner periphery of the rotor mounting the rotor blades, with the rotating member being supported by the pivot type plane bearing at an upper part of the cylindrical member, and with the motor stator being disposed at an upper end of the cylindrical member, while an end plate is disposed at a part of the rotating member opposed to the motor stator.

The magnetic bearing may, in accordance with the present invention, be constructed of permanent magnets, with each permanent magnet being of the type whose magnetism changes little at high temperatures. Moreover, each permanent magnet may be made of a rare-earth magnetic material.

Advantageously, at least one of the constituents of the magnetic bearing may be formed with circular portions concentric with the rotating member, with an inner peripheral surface or outer peripheral surface of the circular portion being arranged at a spacing from another constituent of the magnetic bearing and being adapted to come into touch or contact with the latter when the rotating member vibrates.

It is also possible for one constituent element of the magnetic bearing to be provided with grooves concentric with the rotating member, with the other constituent element of the magnetic bearing being inserted in the grooves with a spacing therebetween.

The pivot type plane bearing may, in accordance with the present invention, be immersed in a lubricating oil having a vapor pressure which is below $10^{-10}$ Torr at a normal temperature and, preferably, the lubricating oil is a fluoric oil.

Accordingly, it is an object of the present invention to provide a turbomolecular vacuum pump which avoids, by simple means, shortcomings and disadvantages encountered in the prior art.

Another object of the present invention resides in providing a turbomolecular vacuum pump by which an arrival degree of vacuum can be enhanced with vibration-dynamic stability.

A still further object of the present invention resides in providing a turbomolecular vacuum pump which ensures the prevention of a reverse diffusion of oil vapor to a high vacuum side of the pump during a stoppage of operation of the pump by virtue of the ability to utilize a lubricating oil of a low vapor pressure.

Yet another object of the present invention resides in providing a turbomolecular vacuum pump which enables the use of a permanent-magnet magnetic bearing arranged on a low vacuum side so as to enable the achievement of an effect wherein the influence of an emission gas due to baking does not extend to a high vacuum side and vacuum device thereby enabling the achievement of the formation of a clean ultra-high vacuum.

A still further object of the present invention resides in providing a turbomolecular vacuum pump which functions realiably under all operating conditions.

These and other objects, features, and advantages of the present invention will become more apparent from the following description when taken in conjunction with the accompanying drawings which show, for the purpose of illustration only, several embodiments in accordance with the present invention.

DETAILED DESCRIPTION

Figure 1:
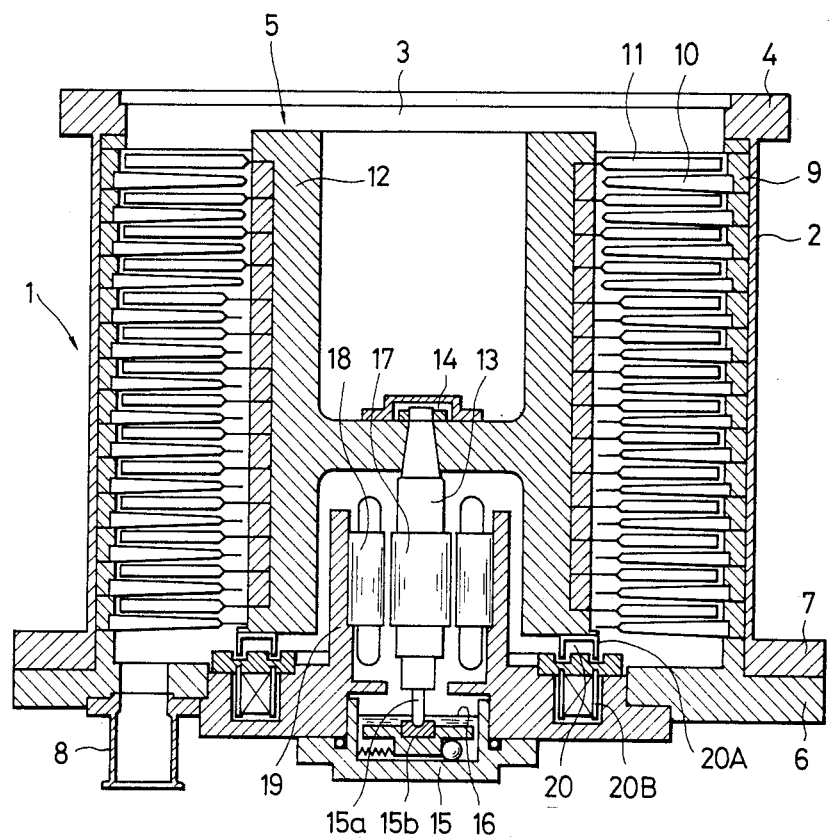
FIG. 1 is a vertical cross sectional view of a turbomolecular vacuum pump constructed in accordance with the present invention.

Referring now to the drawings wherein like reference numerals are used throughout the various views to designate like parts and, more particularly, to FIG. 1, according to this Figure, a turbomolecular vacuum pump generally designated by the reference numeral 1 includes an upper part formed as a cylindrical casing 2, with the casing 2 having a suction port 3 adapted to be disposed in front of a vacuum device (not shown) to be evacuated, which vacuum device is coupled to the casing 2 by a coupling flange 4. A supporting member for a rotating member generally designated by the reference numeral 5 is coupled to a lower part of the casing by a flange 7, with the supporting member 6 being provided with a discharge port 8. Stator blades 10 are stacked in the casing 2 through spacers 9 in a multistage fashion in the direction of a longitudinal axis of the casing 2, and rotor blades 11 are arranged between adjacent stator blades 10.

The rotor blades 11 are fixed to an outer periphery of a rotor 12 located centrally of the casing 2, with the rotor 12 being unitarily coupled with a rotary shaft 13 by a nut 14 so as to form the rotating member 5. The rotating member 5 is supported at its lower end by a pivot type plane bearing generally designated by the reference numeral 15 having, for example, a movable saucer. The pivot type plane bearing 15 includes a pivot 15a and a bearing piece 15b immersed in a lubricating oil 16. By employing the pivot-type plane bearing 15, an oil of a low vapor pressure and high viscosity can readily be used as the lubricating oil 16.

Since, in general, the pivot type plane bearing 15 bears a shaft of a small diameter, a peripheral speed of the shaft is low and the quantity of loss due to heat generation is relatively small. Accordingly, the pivot type plane bearing 15 undergoes less heat generation and corresponding loss as compared with a ball bearing under the conditions of equal load and equal rotational frequencies, and permits the use of a lubricating oil which exhibits a low vapor pressure and a high viscosity such as, for example, fluoric oil having a vapor pressure, at a normal temperature, of below $10^{-10}$ Torr.

A motor rotor 17 is mounted on the rotor shaft 13, and a motor stator 18 opposed thereto, is disposed inside the cylinderical member 19 which extends from the supporting member 6 for the rotating member 5. Permanent magnets 20A, 20B, forming a permanent-magnet magnetic bearing generally designated by the reference numeral 20, are respectively fixed to the lower end of the rotor 12 and a part of the supporting member 6 which is opposed thereto.

Figure 2:
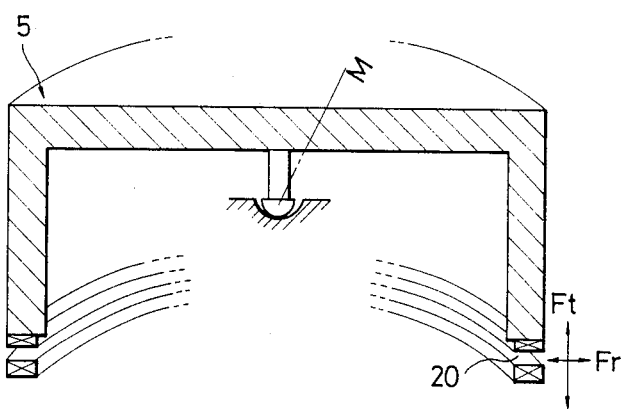
FIG. 2 is a schematic view illustrating a restoring force of the rotating member in the turbomolecular vacuum pump of FIG. 1.

As shown most clearly in FIG. 2, the rotating member 5 forms a structure whose fulcrum is the pivot type plane bearing 15. An attractive force Ft in a thrust direction acts on the magnetic bearing 20, and a force of about 20% acts as a restoring force Fr in a radial direction so that a relation of Ft>>Fr exists. Under this state, when the rotating member 5 inclines and vibrates in a mode M, a restoring force to restore the inclining rotating member 5 back to the original coaxial position becomes Ft, and the great force Ft in the thrust direction can be utilized as the restoring force against the deviation of the rotating member 5. The restoring force corresponds to a moment obtained by multiplying the force Ft in the thrust direction and the approximate radius of the magnetic bearing 20, and such restoring force can be set at a very large value. The adaptation of the structure of FIG. 2 permits a stable fast rotation of the system of the rotating member 5. Furthermore, the permanent magnet 20b constituting the magnetic bearing 20 is provided with circular portions or grooves concentric with the rotating member 5, and constituent elements or parts of the permanent magnet 20a are inserted in the grooves with a radial spacing therebetween.

When the rotating member 5 is vibrated by abnormal vibrations attributable to a disturbance such as, for example, an earthquake, the inner peripheral surface or outer peripheral surface of the permanent magnet 20A comes into contact or touch with the groove of the permanent magnet 20B so as to protect the rotating member 5. When the abnormal vibrations subside, a gyro effect is induced in the rotating member 5 so as to return the rotating member 5 to the center of the normal rotation whereby the rotating member 5 can be continuously safely operated.

With the above construction, when the vacuum device is connected in front of the suction port 3, and the motor stator 18 is energized, the rotating member 5 is rotated at a predetermined high speed, and the turbomolecular vacuum pump 1 starts operating to execute suction, compression, and exhaust. It begins baking at a predetermined temperature and establishes a high vacuum. Meanwhile, the suction gas is compressed by the turbine compression action of the movable vanes 11 and the opposing stationary vanes 10, with the suction gas then being discharged from the discharge port 8 to the next stage.

Since the pivot type plane bearing can use oil of a very low vapor pressure as a lubricating oil, a reverse diffusion of the oil vapor to the high vacuum side hardly occurs during a stoppage of operation of the vacuum 1 so as to ensure the existence of a clean vacuum. Generally, the permanent magnet magnetic bearing 20 is large in quantity of emission gas; however, since the magnetic bearing 20 is installed on the low vacuum side, the quantity of emission gas poses little if any problems. Therefore, even when the gas is emitted due to high temperature baking, no influence is exerted on the high vacuum side and the formation of an ultrahigh degree of vacuum is ensured. Preferably, the permanent-magnet magnetic bearing 20 is made of a rare-earth magnetic material of a high Curie point which can be treated at high temperatures.

Even when a baking is carried out at approximately 300° C., the high vacuum side is uneffected by the attendant gas emission from the permanent magnet magnetic bearing 20, and the interior of the vacuum device can be brought up to an ultrahigh vacuum of a degree of at least $10^{-11}$ Torr.

Figure 3:
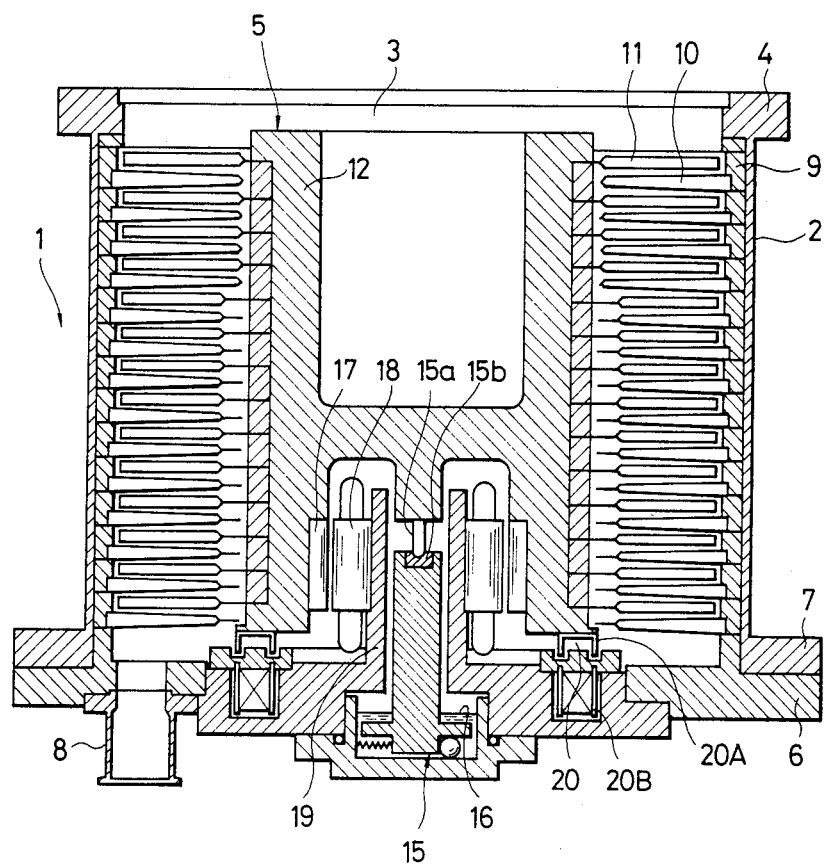
FIG. 3 is a vertical cross-sectional view of another embodiment of a turbomolecular vacuum pump constructed in accordance with the present invention.

As shown in FIG. 3, in a turbomolecular vacuum pump generally designated by the reference numeral 1', the motor stator 18 is diposed outside the cylindrical member 19, and the motor rotor 17 is mounted on a surface of the rotor 12 which opposes the stator 18. The bearing piece 15b of the pivot-type plane bearing 15 is disposed on an upward extension and, although the embodiment of FIG. 3 is basically the same as the embodiment of FIGS. 1 and 2, the rotary shaft 13 for the motor may be eliminated by adopting a so-called outer rotor structure wherein the motor stator 18 is disposed inside the rotor 17 and, consequently, the construction can be simplified. Additionally, since the pivot-type plane bearing 15 can be shifted in an upward direction, a stable fast rotation of the rotating member is readily achievable.

Figure 4:
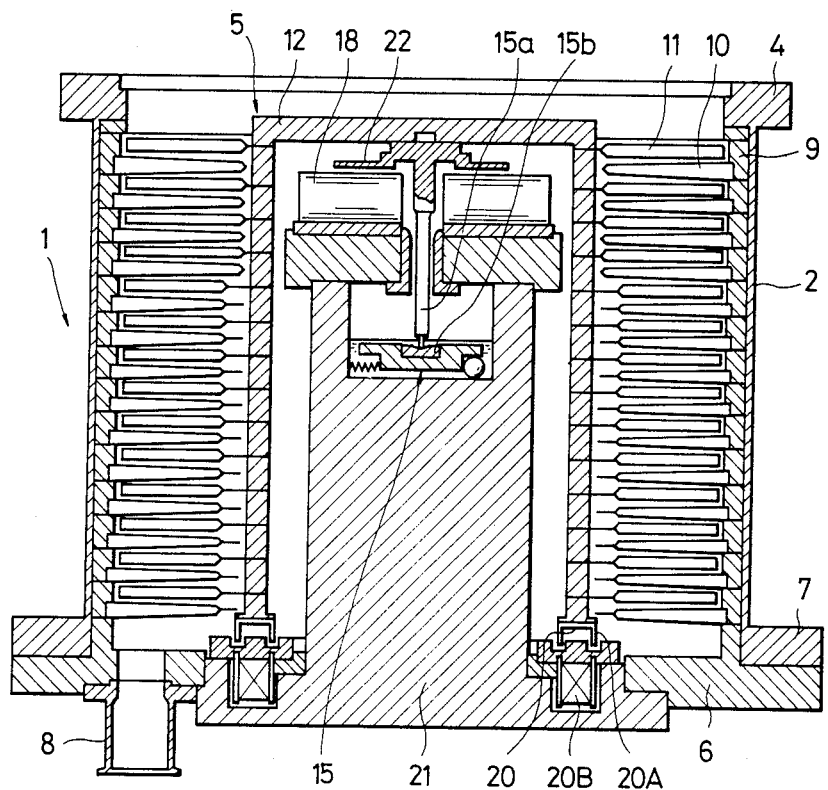
FIG. 4 is a vertical cross-sectional view of a further embodiment of a turbomolecular vacuum pump constructed in accordance with the present invention.

In FIG. 4, a turbomolecular vacuum pump generally designated by the reference numeral 1" includes a cylindrical member 21 extending in a direction of the longitudinal axis of the supporting member for a rotating member generally designated by the reference numeral 5' along an inner periphery of the rotor 12, and the bearing piece 15b of the pivot-type plane bearing 15 is disposed at an upper part of the cylindrical member 21 to thereby support the rotating member 5'. An end plate motor is provided which includes a motor stator 18' mounted on an upper end of the cylindrical member 21 and an end plate 22 fixed to the rotor 12.

By virtue of the constructional features of FIG. 4, while the drive mechanism of the rotating member 5' is more simplified, a stable fast rotation thereof is nevertheless attainable so as to facilitate an achievement of the ultra-high vacuum.

It is also possible in accordance with the present invention to, for example, fabricate the permanent magnetic bearing 20 through the use of a controlled magnetic bearing.

While we have shown and described several embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A turbomolecular vacuum pump comprising a casing means; a plurality of stator blades disposed in the multistage fashion within said casing means in an axial direction thereof; a rotating member including a cylindrical rotor means disposed substantially centrally of said casing means, and a plurality of rotor blades mounted on an outer periphery of said cylindrical rotor means and disposed between respectively adjacent stator blade; a drive means for driving the rotating member; a supporting means coupled to said casing means for supporting the rotating member and the drive means; a suction port means and a discharge port means respectively provided at upper and lower ends of said casing means; a pivot type plane bearing means disposed centrally of said cylindrical rotor means for supporting said rotating member; a magnetic bearing means arranged between a lower end of said cylindrical rotor means and said supporting means; and at least one member of said magnetic bearing means is formed with circular portions concentric with said rotating member, and wherein at least one of an inner or outer peripheral surface of said circular portions is arranged at a predetermined distance from a second member of the magnetic bearing means and is adapted to come into contact with the second member when the rotating member vibrates.

2. A turbomolecular vacuum pump as defined in claim 1, further comprising a cylindrical member vertically extending from said supporting means and disposed concentrically with a rotary shaft of said rotating member, said drive means includes a motor rotor means mounted on the rotary shaft of said rotating member, and a motor stator means disposed inside said cylindrical member in opposition to said motor rotor means.

3. A turbomolecular vacuum pump as defined in claim 1, wherein said drive means includes a motor rotor means disposed inside said rotor means mounting said rotor blades, and a motor stator means, and wherein a cylindrical member extends from said supporting means of said rotating member concentrically with said motor rotor means, said motor stator means being disposed outside said cylindrical member in opposition to said motor rotor means.

4. A turbomolecular vacuum pump as defined in claim 3, wherein said pivot-type plane bearing means includes a saucer means extending upwardly along an inner side of said cylindrical member.

5. A turbomolecular vacuum pump as defined in claim 1, wherein a cylindrical member is vertically extended from said supporting means for said rotating member along an inner periphery of said rotor means, said pivot-type plane bearing means is disposed at an upper end of said cylindrical member for supporting said rotating member, said drive means includes a motor stator means disposed at an upper end of said cylindrical member, and an end plate disposed at a portion of said rotating member opposed to said motor stator means so as to form an end plate motor.

6. A turbomolecular vacuum pump as defined in claim 1, wherein said magnetic bearing means includes permanent magnets.

7. A turbomolecular vacuum pump as defined in claim 6, wherein each of said permanent magnets is a magnet formed of a material such that the magnetism of the permanent magnet changes little at high temperatures.

8. A turbomolecular vacuum pump as defined in claim 7, wherein each permanent magnet is made of a rare-earth magnetic material.

9. A turbomolecular vacuum pump as defined in claim 1, wherein at least one member of said magnetic bearing means is provided with grooves concentric with said rotating member, and wherein a second member of said magnetic bearing means is inserted in said grooves with a spacing therebetween.

10. A turbomolecular vacuum pump as defined in claim 1, wherein said pivot-type plane bearing is immersed in a lubricating oil having a vapor pressure below $10^{-10}$ Torr at a normal temperature.

11. A turbomolecular vacuum pump as defined in claim 10, wherein said lubricating oil is a fluroic oil.

12. A turbomolecular vacuum pump comprising a casing means, a group of multistage stationary vanes arranged within the casing means along an axial direction thereof, a rotor arranged substantially at a center of the casing means, a plurality of multistage movable vanes arranged around an outer periphery of the rotor and disposed between respectively adjacent stationary vanes, and a drive means for driving the rotor, characterized in that said rotor is cup-shaped, a pivot bearing is arranged at a side of an inner periphery of said cup-shaped rotor so as to support said rotor, and a magnetic bearing means subjected to a radial force is arranged only at a lower vacuum side with respect to one of said movable vanes located at a final stage of said group of multistage stationary vanes so as to lie radially outwardly of said pivot bearing.

13. A turbomolecular pump according to claim 12, wherein said magnetic bearing means includes a permanent magnet.

* * * * *